(12) United States Patent
Carr

(10) Patent No.: US 7,286,565 B1
(45) Date of Patent: Oct. 23, 2007

(54) METHOD AND APPARATUS FOR PACKET REASSEMBLY IN A COMMUNICATION SWITCH

(75) Inventor: David W. Carr, Nepean (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 819 days.

(21) Appl. No.: 09/606,860

(22) Filed: Jun. 28, 2000

(51) Int. Cl.
  H04L 12/28 (2006.01)
  H04L 12/54 (2006.01)
  G06F 13/38 (2006.01)
(52) U.S. Cl. .................. 370/474; 370/401; 370/476; 709/238
(58) Field of Classification Search ........... 370/362, 370/386–395, 466–474, 401–412, 429, 413, 370/359, 326, 419, 428, 464; 709/236–250
See application file for complete search history.

(56) References Cited

U.S. PATENT DOCUMENTS

| 5,113,392 | A | * | 5/1992 | Takiyasu et al. ............. 370/473 |
| 5,303,302 | A |   | 4/1994 | Burrows |
| 5,396,490 | A | * | 3/1995 | White et al. ................ 370/474 |
| 5,568,477 | A | * | 10/1996 | Galand et al. ............... 370/229 |
| 5,809,024 | A | * | 9/1998 | Ferguson et al. ............ 370/395 |
| 5,862,355 | A | * | 1/1999 | Logsdon ..................... 710/116 |
| 5,898,688 | A | * | 4/1999 | Norton et al. ............... 370/362 |
| 5,956,341 | A | * | 9/1999 | Galand et al. ............... 370/412 |
| 6,216,167 | B1 | * | 4/2001 | Momirov ..................... 709/238 |
| 6,233,243 | B1 | * | 5/2001 | Ganmukhi et al. ......... 370/412 |
| 6,243,382 | B1 | * | 6/2001 | O'Neill et al. .............. 370/395 |
| 6,259,699 | B1 | * | 7/2001 | Opalka et al. .............. 370/398 |
| 6,463,067 | B1 | * | 10/2002 | Hebb et al. ................. 370/413 |
| 6,487,203 | B1 | * | 11/2002 | Chung et al. ............... 370/395 |
| 6,493,356 | B1 | * | 12/2002 | Aramizu et al. ............ 370/474 |
| 6,618,376 | B2 | * | 9/2003 | Rumer ........................ 370/395 |
| 6,621,828 | B1 | * | 9/2003 | Field et al. ................. 370/466 |
| 6,714,985 | B1 | * | 3/2004 | Malagrino et al. .......... 709/236 |
| 6,751,214 | B1 | * | 6/2004 | Parruck et al. ............. 370/352 |
| 6,963,572 | B1 | * | 11/2005 | Carr et al. .................. 370/401 |
| 6,965,615 | B1 | * | 11/2005 | Kerr et al. .................. 370/474 |
| 7,027,443 | B2 | * | 4/2006 | Nichols et al. ............. 370/394 |
| 7,139,271 | B1 | * | 11/2006 | Parruck et al. ............. 370/392 |
| 7,142,564 | B1 | * | 11/2006 | Parruck et al. ............. 370/474 |
| 7,145,910 | B2 | * | 12/2006 | Parruck et al. .......... 370/395.1 |
| 2002/0089977 | A1 | * | 7/2002 | Chang et al. ............... 370/386 |

(Continued)

FOREIGN PATENT DOCUMENTS

EP   0 852 450 A2   7/1998

*Primary Examiner*—Man U. Phan

(57) ABSTRACT

A method and apparatus for reassembling packets using a limited number of reassembly contexts is presented. Upon receipt of a first cell of a packet corresponding to a selected source, a reassembly context is allocated to the selected source. The reassembly context is allocated from a limited set of reassembly contexts. The first cell is then stored in a buffer and the reassembly context is updated to reflect the storage of the first cell in the buffer. As subsequent cells of the packet are received they are stored in the buffer and the reassembly context is updated to reflect the storage of each of these subsequent cells. When an end of message cell is received for the packet that indicates the end of the packet, reassembly of the packet within the buffer is completed to produce a reassembled packet. The reassembled packet is then queued for transmission to a destination, and the reassembly context is deallocated such that is can be used for reassembly of a subsequently received packet.

28 Claims, 5 Drawing Sheets

U.S. PATENT DOCUMENTS

| | | | |
|---|---|---|---|
| 2003/0028666 A1* | 2/2003 | Hanner | 709/238 |
| 2003/0223458 A1* | 12/2003 | Mathews et al. | 370/474 |
| 2004/0017810 A1* | 1/2004 | Anderson et al. | 370/390 |
| 2006/0050738 A1* | 3/2006 | Carr et al. | 370/474 |

* cited by examiner

METHOD AND APPARATUS FOR PACKET REASSEMBLY IN A COMMUNICATION SWITCH

FIELD OF THE INVENTION

The invention relates generally to communications and more particularly to a method and apparatus for reassembling packets in a communication switch.

BACKGROUND OF THE INVENTION

Communication networks are known to include a plurality of communication switches that are interoperably coupled to provide communication links between end users. Such end users are coupled to the communication network via ports associated with the plurality of switches. The end users may be individual users such as personal computers, telephones, video phones, facsimile machines, etc. End users may also be other network components such as servers, routers, private branch exchanges (PBX), etc.

Each switch included in the network can receive data from a plurality of ingress connections and relay that data to one or more of a plurality of egress connections. In many cases, data corresponding to a transmission (i.e. a data packet) is broken up at the ingress portion of a communication switch and reassembled at the egress portion of the switch prior to being provided to either a subsequent switch or an end user via an egress connection. Because data for any egress connections can be received by the switch on one of any of the ingress connections, a large number of reassembly operations may be occurring simultaneously within the switch. Such packet reassembly requires adequate buffering space and context information such that the location of each packet is well understood within the buffering space.

Maintenance of context information within such switches can be an overwhelming task when the number of potential ingress connections and egress connections are considered. In prior art switches that performed all of the routing of cells within the switch for packets using circuitry within the ingress line cards, the number of required reassembly contexts to ensure proper forwarding of data is impractical to implement. For example, if a switch receives M ingress connections on each of X line cards and supports N egress connections in each egress line card, the number of potential contexts that may have to be supported in a single egress line card is equal to (M*X)*N. In such prior art systems that do not include any cell routing within the egress line card, this quantity of contexts must be available for each egress line card to ensure that no intermingling of cells for different packets corresponding to an egress connection occurs. Because the number of ingress and egress connections can be substantial, the number of contexts that must be allocated can consume a large amount of resources. In an example switch with 16 ingress line cards, where each ingress line card supports 16 K ingress connections, a single egress line card that supports 16 K egress connections would be required to support on the order of 4 billion reassembly contexts, which is impractical.

Therefore, a need exists for a method and apparatus for efficiently maintaining context information for packets being reassembled.

DETAILED DESCRIPTION OF A PREFERRED EMBODIMENT OF THE INVENTION

Generally, the present invention provides a method and apparatus for reassembling packets using a limited number of reassembly contexts. Upon receipt of a first cell of a packet corresponding to a selected source, a reassembly context is allocated to the selected source. The reassembly context is allocated from a limited set of reassembly contexts. The first cell is then stored in a buffer and the reassembly context is updated to reflect the storage of the first cell in the buffer. As subsequent cells of the packet are received they are stored in the buffer and the reassembly context is updated to reflect the storage of each of these subsequent cells. When an end of message cell is received for the packet that indicates the end of the packet, reassembly of the packet within the buffer is completed to produce a reassembled packet. The reassembled packet is then queued for transmission to a destination, and the reassembly context is deallocated such that is can be used for reassembly of a subsequently received packet. By controlling the allocation and deallocation of a limited set of reassembly contexts, the number of reassembly contexts that need to be supported can be limited while ensuring that received packets are correctly reassembled for transmission.

Figure 1:
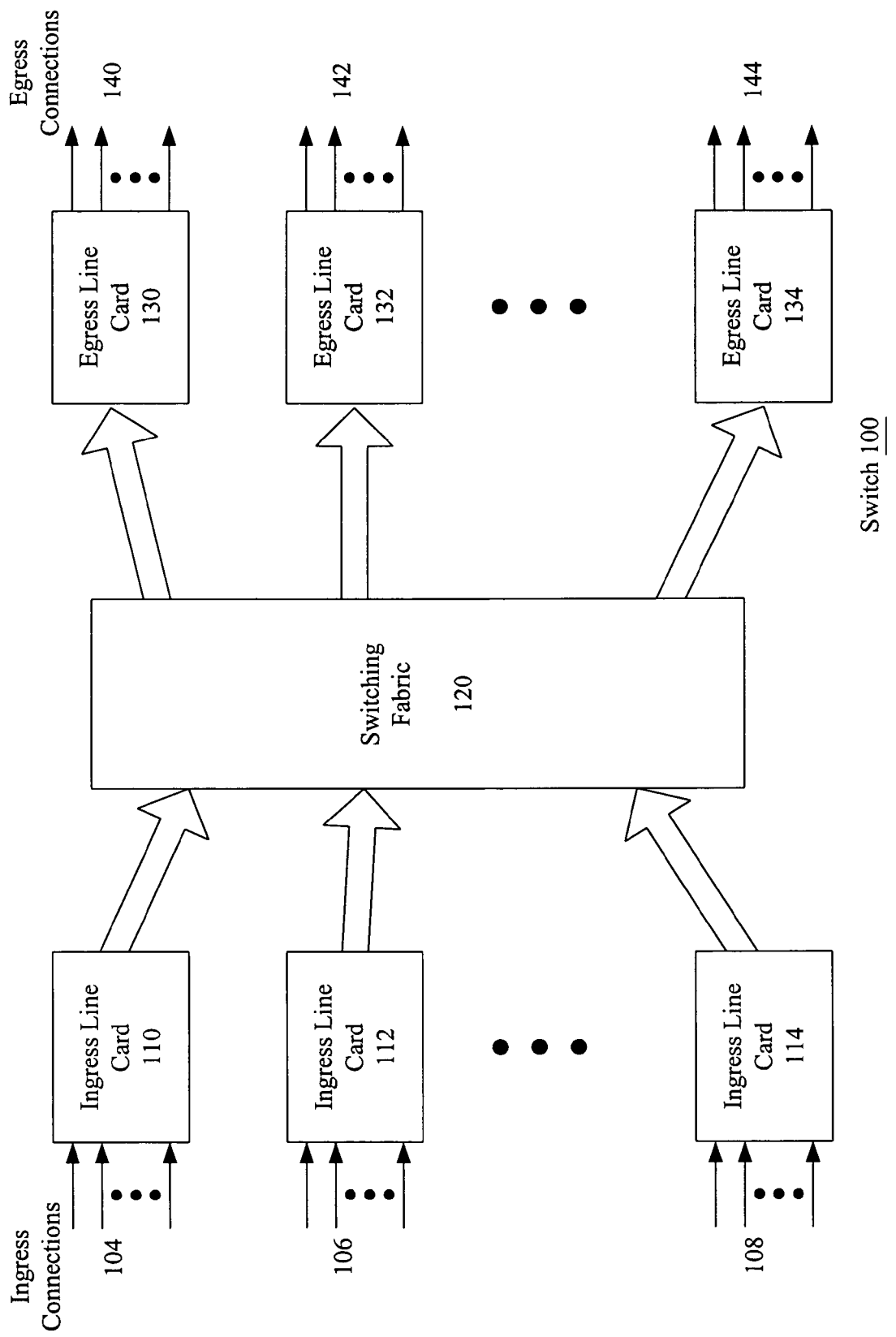
FIG. 1 illustrates a block diagram of a communication switch in accordance with a particular embodiment of the present invention.

The invention can be better understood with reference to FIGS. 1-5. FIG. 1 illustrates a block diagram of a switch 100 that includes a switching fabric 120. The switching fabric 120 is interoperably coupled to a plurality of ingress line cards 110-114 and a plurality of egress line cards 130-134. Each of the ingress line cards, or circuits, 110-114 receives data via a corresponding plurality of ingress connections 104-108. Preferably, the ingress connections correspond to ingress virtual connections (VCs), the establishment and use of which is known in the art. The ingress line card 110 receives data via the ingress connections 104, the ingress line card 112 receives data via ingress connections 106, and the ingress line card 114 receives data via ingress connections 108.

The switch 100 may be an ATM switch that receives data over the ingress connections 104-108 as ATM cells. In other embodiments, the ingress connections may support other data protocol formats such as internet protocol (IP), frame relay, or other various communication protocols that may utilize fixed- or variable-length packets. As data corresponding to different packets is received by each of the ingress line cards 110-114, the received data is forwarded to a corresponding egress line card via the switching fabric 120. Thus, the switching fabric 120 allows data received on any of the ingress line cards 110-114 to be forwarded to any of the egress line cards 130-134.

Each of the egress line cards 130-134 supports a corresponding set of egress connections 140-144, respectively, which may be egress VCs. Data typically traverses the switching fabric 120 in a segmented format such that reassembly of the packet within each of the line cards 130-134 is required prior to transmission over one or more of the egress connections. In the case of an ATM switch, ATM cells will be used to transfer the packet from the ingress line cards 110-114 to the egress line cards 130-134. Thus, a received packet is segmented into cells and transported across the switching fabric 120 to one or more egress line cards for reassembly and transmission.

Each of the cells transmitted across the switching fabric 120, which may also be referred to as a backplane of the switch, includes a virtual connection identifier (VCI) that indicates a particular VC to which the cell corresponds. As stated above, each of the ingress connections received by the switch 100 may correspond to a particular VC. Each cell also preferably includes an indication as to the source line card, or ingress line card, from which it originated within the switch. Based on these indicators, the egress line card can determine to which packet a particular cell corresponds. As such, the egress line card can use this information included in each cell to reassemble the packet prior to transmission on the egress connection.

Each of the egress line cards 130-134 may receive data corresponding to any of the ingress VCs. As such, in prior art solutions that lacked any routing circuitry within the egress line cards, the maintenance of the information required for performing packet reassembly could become problematic due to the resources required to maintain such information. For example, a prior art solution may have allocated a context for each ingress connection (source) for the switch for each egress connection, which is inefficient and impractical when a large number of ingress and egress connections are supported. The present invention provides an efficient means for maintaining reassembly context information and performing packet reassembly using limited context resources.

In one embodiment of the invention, a reassembly context is available within the egress card for each ingress connection to the switch. Thus, in the case of a switch with 16 ingress line cards where each has 16 K ingress connections, 256 K reassembly contexts would be available in the egress line card. Once a packet is reassembled that corresponds to a particular ingress connection within the egress card, it can be forwarded via routing circuitry to the appropriate queues within a traffic management block for transmission via one or more egress connections. The reassembly context for that ingress connection would then be available for receiving a subsequent packet. The routing circuitry included in the egress line card allows for intelligent forwarding of assembled packets such that the reassembly contexts are maintained to correspond to the source of the packet rather than the destination. Because each ingress connection will only provide cells to a egress line card that correspond to a single packet at one time, there is no need to maintain more than one reassembly context for each ingress connection (source).

Figure 2:
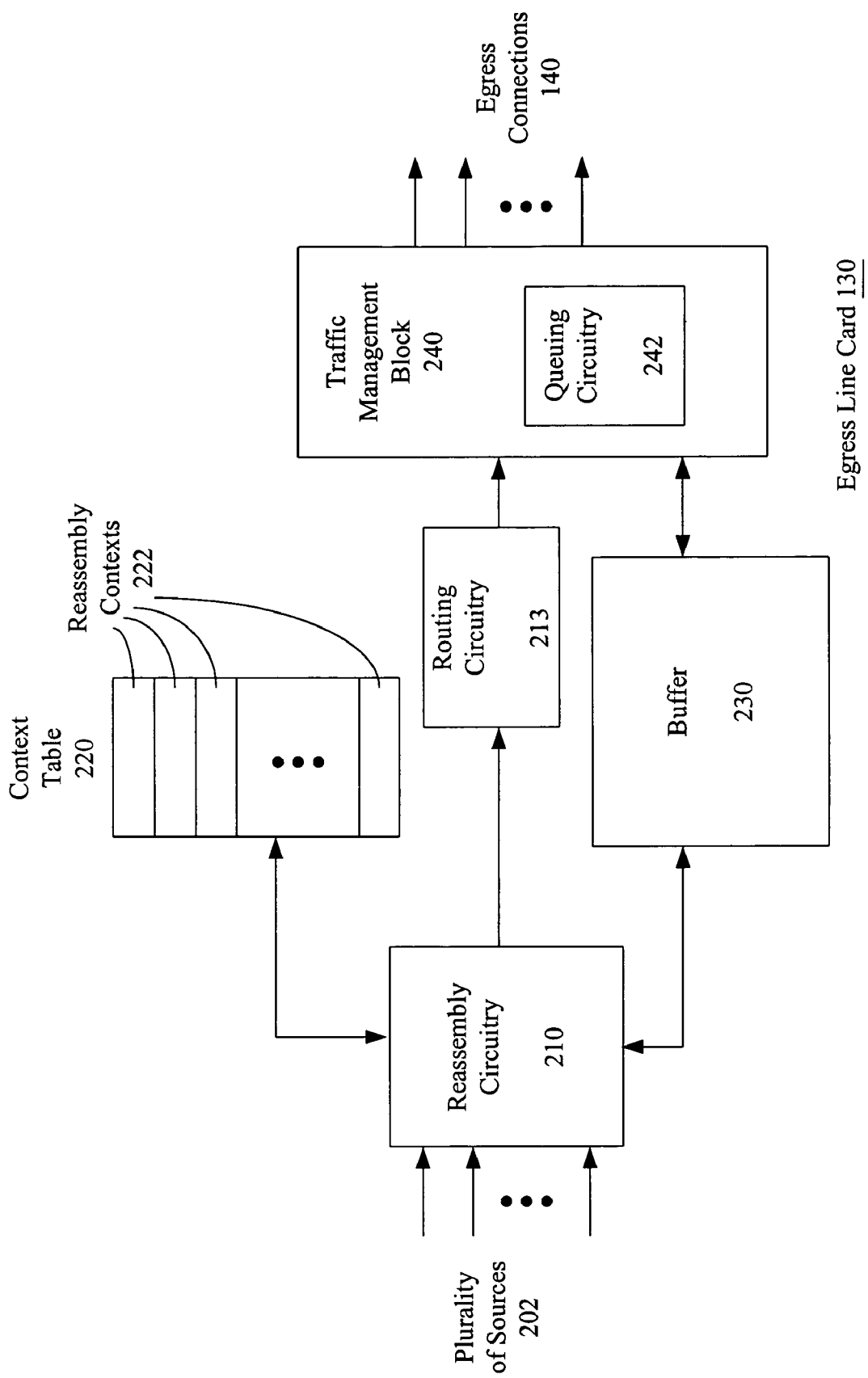
FIG. 2 illustrates a block diagram of an egress line card in accordance with a particular embodiment of the present invention.

FIG. 2 illustrates a more detailed view of the egress line card 130 of FIG. 1 for a particular embodiment of the invention. As is illustrated, the egress line card 130 includes reassembly circuitry 210, a context table 220, routing circuitry 213, a buffer 230, and a traffic management block 240. The context table 220 stores a plurality of reassembly contexts 222, where each of the plurality of reassembly contexts can be used to store the reassembly context information corresponding to a packet currently being reassembled.

In some embodiments, the present invention allows for reassembly contexts to be allocated to a particular packet upon receipt of the first cell of that packet and deallocated upon receipt of the final cell of the packet. As such, reassembly contexts may be flexibly assigned to different sources, thus enabling sharing of the reassembly contexts by a number of sources over time. By sharing the contexts, a limited number of reassembly contexts can be maintained, thus limiting the overhead associated with maintaining reassembly contexts in the switch.

The reassembly circuitry 210 receives cells or other packet portions (segments) from a plurality of sources 202. Preferably, the plurality of sources 202 corresponds to data received from a switching fabric or backplane from a number of ingress line cards. Each of the sources may correspond to a particular virtual connection (VC) that provides data to one of the ingress line cards. Each VC is limited to sending cells corresponding to a single packet until that packet has been completely transmitted to the egress line card 130. By recognizing this limitation, the egress line card 130 can limit the number of reassembly contexts that it supports to the maximum number of VCs that may be active at any one time. This embodiment was described above where each ingress connection has a supporting reassembly context in each egress line card. In other embodiments, the context table 220 may include fewer reassembly contexts than there are potential source VCs such that dynamic allocation of the limited number of reassembly contexts 222 is required. In such an embodiment, if all of the reassembly contexts are being used and an additional context is needed for supporting reassembly of another packet, the cells corresponding to that packet need to be recognized and discarded such that other circuitry within the egress line card 130 is not confused or forced to wastefully process the cell traffic which cannot be reassembled due to the unavailability of a reassembly context.

The reassembly circuitry 210, which is operably coupled to the context table 220, the buffer 230, and the routing circuitry 213, controls the reassembly of the packets in the buffer 230 utilizing the context table 220 and the reassembly contexts 222 maintained therein. Upon receipt of a first cell for a packet from a source (VC) the routing circuitry allocates a reassembly context to the source. The identity of the source can be determined from the VCI included in the cell, or through other source information included in the segment of data used in the particular system. Allocation of the reassembly context is accomplished by consulting the context table 220 to find an available reassembly context, which is then used to store the context information for the packet that has just begun to be received. The context table 220 may include multiple tables where one table stores currently unused, or free reassembly contexts, whereas one or more others stores currently active reassembly contexts that are being used to control the reassembly of packets.

The first cell received for the packet is stored in the buffer 230 and the reassembly context for the packet is updated to reflect that a cell for the packet to which the reassembly context corresponds has been stored in the buffer 230. Preferably, the cells for a packet are stored in the buffer 230 in a linked list format, where storage of data in linked list formats is well known in the art. In such an instance, the reassembly context for the packet will include a head pointer that points to the first cell for the packet in the buffer (the head of the linked list), and a tail pointer which points to the last cell currently stored for the packet in the buffer 230 (the tail of the linked list). Cells included in the linked list within the buffer point to the cell that succeeds them within the linked list such that each cell has a pointer to the next cell in the linked list until the tail of the linked list is reached.

As subsequent cells for the packet are received by the reassembly circuitry 210, the subsequent cells are stored in the buffer 230 and the reassembly context that corresponds to the packet is updated to reflect storage of the subsequent cells. These subsequent cells for the packet can be detected based on the VCI or other source information that they contain. In the case where the cells of the packet are being stored in the buffer 230 in a linked list format, the subsequent cells are appended to the tail of the linked list and the tail pointer of the reassembly context is updated to reflect the newly added cells.

When a final cell for the packet is received, the reassembly circuitry 210 stores the final cell in the buffer 230 and updates the reassembly context corresponding to the packet to reflect storage of the final cell. The final cell for a packet is recognized as it is identified as an end of message (EOM) cell. Once the EOM cell is detected and the reassembly of the packet is complete, an indication is provided to the traffic management block 240 that the packet has been fully reassembled within the buffer 230. In the embodiment illustrated, the indication is provided via the routing circuitry 213, and may be accomplished by storing the head pointer to the linked list for the packet in the appropriate output queues within the traffic management block 240. In other embodiments, the traffic management block 240 may access the context table 220 itself to determine the relevant context information for the packet to be transmitted, or the information included in the context for the packet may be provided to the traffic management block 240 either by the reassembly circuitry 210 or through some other means.

Once the traffic management block 240 has been notified that the packet has been reassembled, the reassembly context that has been used to reassemble the packet is deallocated. Upon deallocation, the reassembly context is free to be used for the reassembly of a subsequently received packet. This subsequently received packet may be received from any of the plurality of sources 202, where each of the plurality of sources 202 may correspond a different VC.

Once a packet is queued for transmission within the traffic management block 240, the traffic management block retrieves the cells for the packets from the buffer 230 and transmits the packets that are ready for transmission over at least one of the egress connections 140. Buffering for all of the egress connections is shared and the routing circuitry 213 indicates to the traffic management block 240 over which egress connection(s) a particular packet is to be transmitted.

The indication received by the traffic management block 240 from the routing circuitry 213 that pertains to the completion of reassembly of a particular packet may be in the form of a control cell. The control cell may simply queue the head pointer to a packet in the buffer 230 into an output queue corresponding to an egress connection. In the case where a particular packet is to be transmitted to a plurality of the egress connections 140, the control cell received by the traffic management block 240 for that packet may include indications as to which of the egress connections 140 are to be used for transmission of the multicast packet. In other embodiments, a control cell may be provided to the traffic management block 240 for each of the egress connections when a packet is to be sent out over multiple connections.

In some cases, encapsulation of a packet needs to be modified prior to transmission on one or more of the egress connections 140. As such, the traffic management block 240 may include encapsulation modification circuitry or routines that can perform such encapsulation modification. The routing circuitry 213 may include in a control cell, or may provide through some other means, an indication as to the required encapsulation for various egress connections to the traffic management block 240 to facilitate such encapsulation alterations.

Because of bandwidth limitations over one or more of the egress connections 140, the traffic management block 240 may not be able to immediately transmit a packet that is ready for transmission. As such, the traffic management block 240 may include queuing circuitry 242 that helps to control the ordering with which various packets are transmitted over the egress connections 140. The queuing circuitry 242 may include a plurality of queues in which packets await transmission. These queue structures may correspond to different classes or connections such that different packets are queued in different manners based on either their class or quality of service or their intended destination.

While reassembling the packet, the reassembly circuitry 210 may perform the additional function of verifying proper receipt of the cells for the packet as transmitted across the backplane of the switch. This may include verifying cyclical redundancy check (CRC) values commonly used to monitor the accurate transmission of data. A running CRC value could be maintained with the context information for the packet and verified against a received CRC value to determine if the packet was properly received. If the packet is corrupted during transmission across the backplane of the switch, the packet may be purged such that it is not transmitted in its corrupted format.

Figure 3:
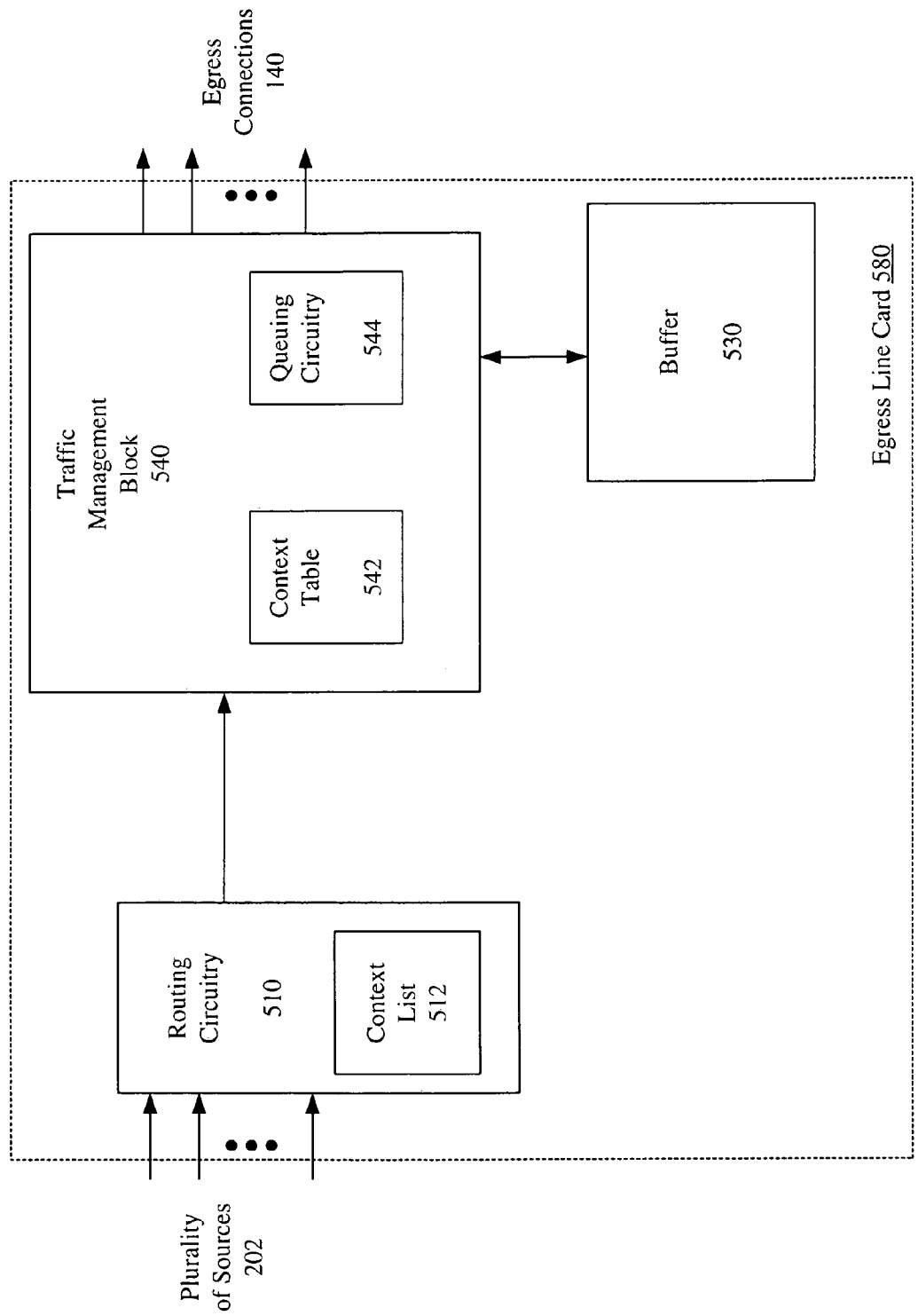
FIG. 3 illustrates a block diagram of an alternate egress line card in accordance with a particular embodiment of the present invention.

FIG. 3 illustrates a block diagram of an alternate embodiment of an egress line card 580. The embodiment illustrated in FIG. 3 includes routing circuitry 510, a traffic management block 540, and a buffer 530. The routing circuitry receives cells corresponding to packets from the plurality of sources 202. The routing circuitry 510 helps to facilitate the reassembly and buffering of the traffic management block 540 by assigning a reassembly context to each packet as the first cell for the packet is received.

As was the case with the egress line card 130 of FIG. 2, the source from which a cell was received can be determined by the VCI and source indicators included in the cell. When the routing circuitry 510 determines to which source a cell corresponds, it determines if the cell is the first cell received for a new packet. If it is the first cell, the routing circuitry 510 assigns a reassembly context to the packet from the context list 512. The context list 512 may be structured to include a list of free contexts as well as a list of those contexts that have been assigned and the respective sources corresponding to the assigned contexts.

If a cell that is received is a subsequent cell for a packet for which the first cell has already been received, the reassembly context assigned for that packet can be determined by referencing the context list. Once the context for a cell has been determined by the routing circuitry 510 it is passed to the traffic management block 540 with an indication as to the identity of the reassembly context for the packet to which the cell corresponds. The traffic management block uses the identity of the reassembly context to reference the context table 542, which stores the context information for the particular packet. Thus, the contexts assigned by the routing circuitry 510 are maintained by the traffic management block 540 as the packets are reassembled. Preferably, each packet is reassembled in the buffer 530 as a linked list, and the context information stored in the context table 542 would include the head and tail pointers for the linked list.

When the final cell for a packet is received by the routing circuitry 510, the context corresponding to the cell is determined, and the cell is forwarded to the traffic management block with an indication as to the reassembly context assigned to the packet to which the cell corresponds. The cell may also be accompanied by an indication that the cell is the final cell of the packet. Once the final cell for a packet has been relayed to the traffic management block, the routing circuitry 510 can reclassify the context corresponding to that packet as free, or available context. This is because once the final cell is received by the traffic management block 540, the packet will be queued for transmission and therefore the reassembly context used to reassemble the packet will be available for use with a subsequent packet.

When the traffic management block 540 receives the final cell for a packet from the routing circuitry 510, the traffic management block 540 completes reassembly of the packet in the buffer 530. Once reassembly is complete, the context information that is required to fetch the packet from the buffer 530, which may be the head pointer to the packet, is moved to the output queuing circuitry 544. The output queuing circuitry is used to control the transmission of packets via the plurality of egress connections 140 supported by the egress line card 580. In the case where a packet is to be multicast over a plurality of the egress connections, the relevant context information may be stored in a plurality of output queues corresponding to the appropriate egress connections.

The routing circuitry 510 of FIG. 3 may also be used to perform CRC checks or other verification with respect to packets received. Thus, the context list 512 may be used to store running CRC values corresponding to packets that are currently being received. If the routing circuitry 510 determines that a CRC error has been detected and a particular packet may be corrupted as forwarded to the traffic management block 540, the routing circuitry 510 may provide an indication as to the corrupt packet to the traffic management block 540 such that the corrupt packet is purged from the buffer 530. When this occurs, the reassembly context being used for this packet may be flagged such that future cells corresponding to the packet are discarded.

As is apparent to one of ordinary skill in the art, the various functions performed by the reassembly, routing, and traffic management blocks described with respect to the egress line cards in FIGS. 2 and 3 may be shifted between different blocks of circuitry in order to suit the needs of a particular system. Thus, in some embodiments, the buffer in which the packets are reassembled may be under the exclusive control of a block performing both reassembly and the queuing of the reassembled packets for transmission. In other embodiments, reassembly of the packets may be directed by one block of circuitry while another block fetches and queues the reassembled packets for transmission. Because some of the circuit blocks may be designed as application specific integrated circuits (ASICs), certain portions of the functionality may be shifted to other blocks in order to improve the cost-effectiveness of design and implementation of the various integrated circuits.

Figure 4:
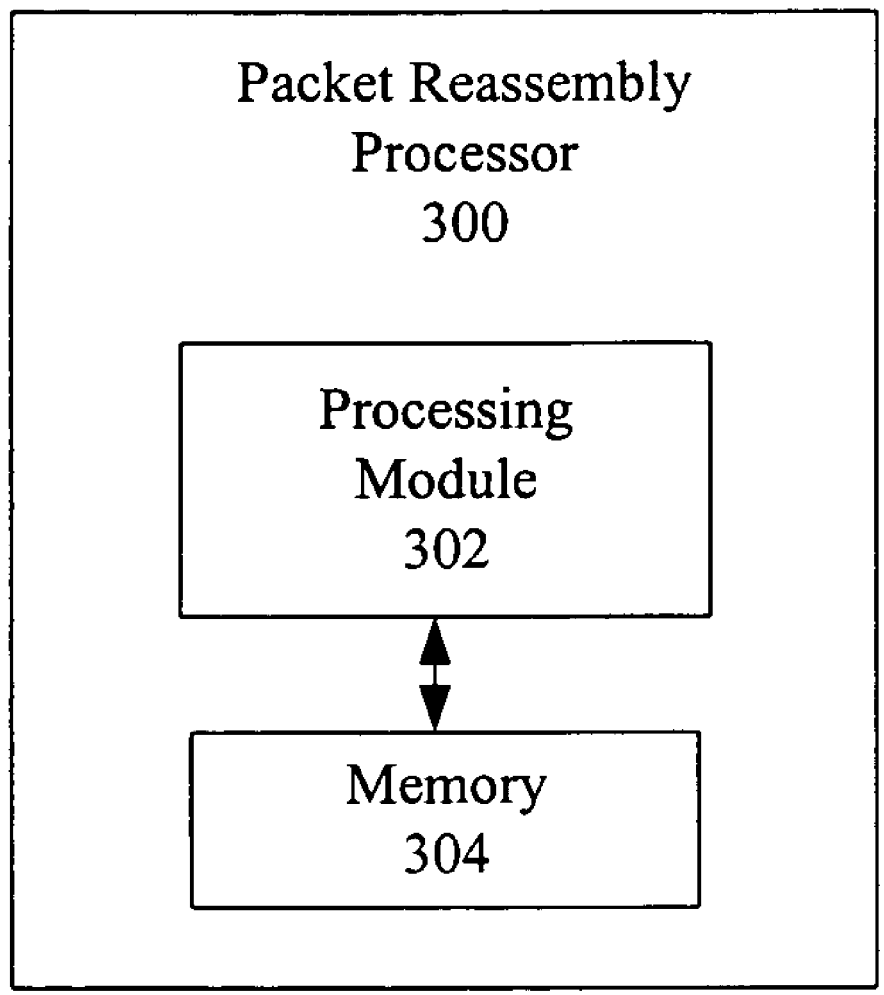
FIG. 4 illustrates a packet reassembly processor in accordance with a particular embodiment of the present invention.
Figure 5:
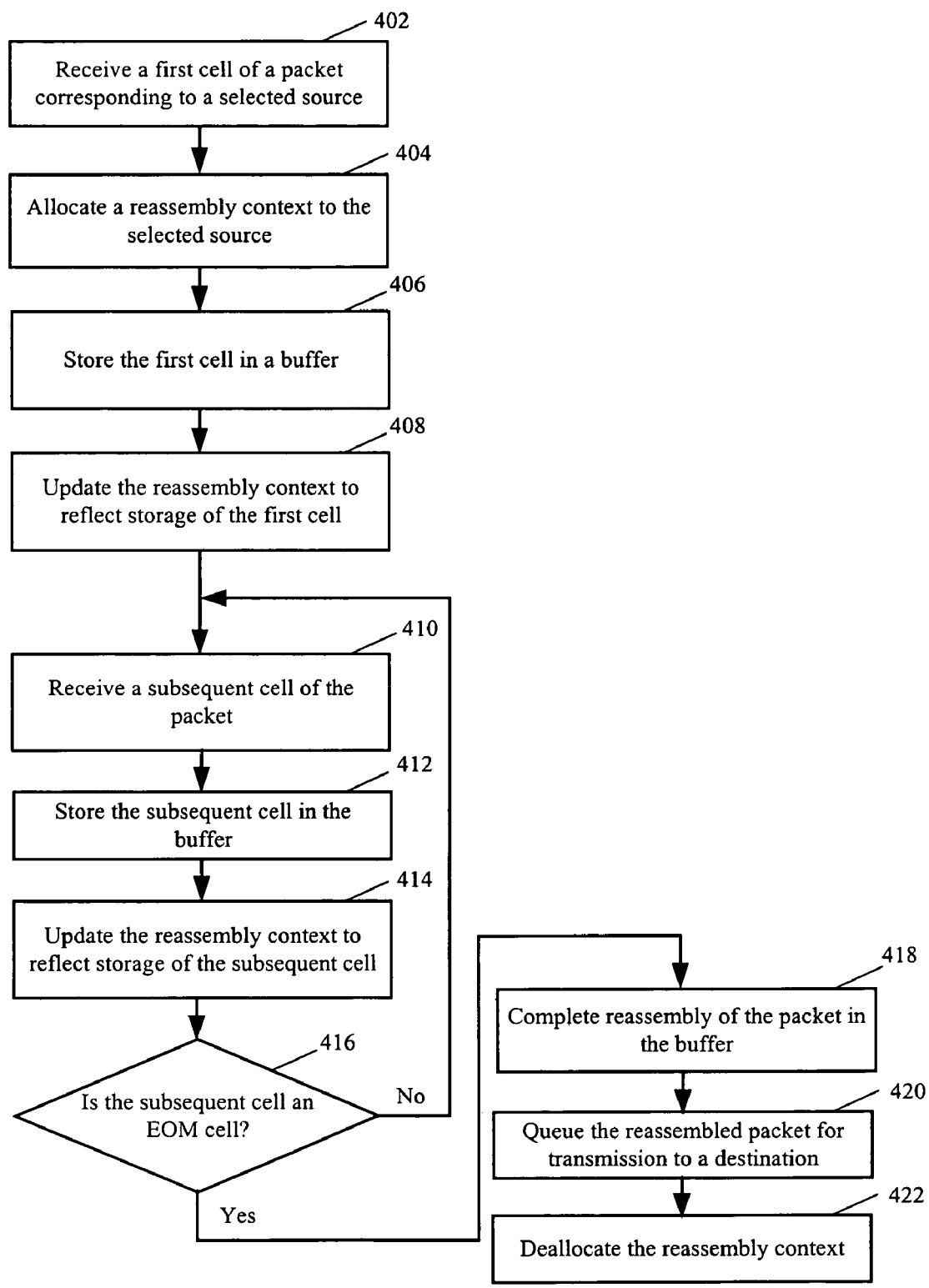
FIG. 5 illustrates a flow diagram of a method for controlling reassembly and transmission of a packet in accordance with a particular embodiment of the present invention.

FIG. 4 illustrates a block diagram of a packet reassembly processor 300 that may be used to perform the functions illustrated in FIG. 5. Some of the functions included in the method of FIG. 5 may be performed through software executed by the packet reassembly processor 300, whereas other portions of the method may be performed using hardware included within the packet reassembly processor 300. In one embodiment, the packet reassembly processor 300 is included in an egress line card within a switch, which may be an ATM switch.

The packet reassembly processor 300 includes a processing module 302 that is operably coupled to memory 304. The processing module 302 may be a single processing device or a plurality of processing devices. Such a processing device may be a microprocessor, microcontroller, digital signal processor, microcomputer, state machine, logic circuitry, or any device that processes information based on operational or programming instructions.

The memory 304 may be a single memory device or a plurality of memory devices. Such a memory device may be a read only memory device, random access memory device, floppy disk, hard drive memory, or any device that stores digital information. Note that when the processing module 302 has one or more of its functions performed by a state machine or logic circuitry, the memory containing the corresponding operational instructions is embedded within the state machine or logic circuitry.

The memory 304 stores programming or operational instructions that, when executed by the processing module 302, cause the processing module 302 to perform at least a portion of the steps of the method illustrated in FIG. 5. In the case where the memory 304 is required to store intermediate data or buffer data as part of the functions executed, at least a portion of the memory 304 is assumed to include some type of memory that supports both read and write functionality, such as random access memory.

FIG. 5 illustrates a flow diagram of a method for controlling reassembly and transmission of a packet in a communication switch. The communication switch may be an ATM switch, and the method illustrated in FIG. 5 may be implemented within an egress line card or other egress circuit within the communication switch. The packet being reassembled may be a fixed- or variable-length packet, and may correspond to one of a number of data communication protocols including IP, frame relay, ATM, etc.

The method of FIG. 5 begins at step 402 where a first cell of a packet corresponding to a selected source of a plurality of sources is received. The selected source may be a particular VC, where the first cell includes a VCI corresponding to the VC and may also include a source identifier that indicates the line card within a switch from which the cell originated. The determination that the cell is a first cell for a packet may be performed by determining if there is already a reassembly context allocated to the selected source to which the cell corresponds. If there is no current allocation of a reassembly context to that source, it may be assumed that the cell is the first cell of a packet.

At step 404, a reassembly context is allocated to the selected source in response to the receipt of the first cell. In one embodiment of the invention, each source has a dedicated reassembly context and such a dedicated reassembly context is activated upon receipt of the first cell for a packet from the source to which the reassembly context is assigned. In other embodiments, a fixed number of reassembly contexts may be assigned dynamically. If dynamic allocation of reassembly contexts is used, allocation of a reassembly context may include determining a free reassembly context from either a free list or from a table that includes indications as to which reassembly contexts are currently being used and which are not. As described earlier, the set of reassembly contexts which are dynamically allocated may include a number of contexts that is fewer than a number of sources included in the plurality of sources from which cells may be received. As such, there may not be a reassembly context available for allocation for every packet received. In such instances, cells corresponding to packets for which no reassembly context can be allocated may be discarded in order to eliminate unnecessary processing of such cells that will not be reassembled and transmitted.

At step 406, the first cell received for the packet is stored in a buffer. In one embodiment, storage of the first cell begins a linked list corresponding to the packet. As such, the context information that has been allocated for the packet would include a head pointer that points to the first cell as stored in the buffer as this cell will be at the head of the linked list. The context information for the packet will also include a tail pointer, where the tail pointer points to the last cell currently stored for the packet within the buffer. Therefore, upon storage of the first cell, the head and tail pointers will both point to the location of the first cell in the buffer. This setting of these pointers may be accomplished at step 408 where the reassembly context for the packet is updated to reflect storage of the first cell in the buffer. Note that storage of the cells in the buffer may be performed using data structures other than linked list structures. Regardless of the storage technique, the context allocated to a packet preferably includes the information required to both continue reassembly of the packet in the buffer and allow the packet to be dequeued upon complete reassembly for transmission.

At step 410, a subsequent cell of the packet is received. Based on the VCI or other indications included within the subsequent cell, the appropriate context for the packet to which the cell corresponds can be determined. Once the context is determined, the subsequent cell is stored in the cell buffer at step 412, and the reassembly context for the packet is updated at step 414. In the case where the packet is stored in the buffer as a linked list, step 412 is performed by appending the subsequently received cell to the linked list within the buffer, and step 414 includes modifying the tail pointer to reflect storage of the subsequent cell such that the tail pointer would then point to the last cell currently buffered for the packet.

At step 416, it is determined if the subsequent cell received at step 410 is an end of message (EOM) cell that indicates the end of the packet. If the subsequent cell is an EOM cell, the method proceeds to step 418. If the subsequent cell is not an EOM cell, which indicates that additional cells must be buffered to complete reassembly of the packet, the method returns to step 410 where subsequent cells are received and stored until an end of message cell is received and detected at step 416.

Once an EOM cell for the packet is detected at step 416, reassembly of the packet in the buffer is completed at step 418. At step 420, the reassembled packet is queued for transmission to a destination. Queuing of the reassembled packet for transmission to a destination may include sending a control cell to a traffic management circuit or storing a pointer to the reassembled packet in a queue structure that is used to control transmission over one or more egress connections to one or more destinations. In the case where multiple destinations are supported, the packet encapsulation may have to be modified to suit the needs of each particular destination. As such, queuing the reassembled packet for transmission may also include queuing or performing some type of encapsulation modification such that the encapsulation is properly modified prior to transmission. In the case where the packet is to be transmitted to multiple destinations over multiple egress connections, multiple control cells may be issued or a single control cell that includes the identity of the multiple destinations or egress connections may be utilized.

Once the reassembled packet has been queued for transmission at step 420, the method proceeds to step 422 where the reassembly context that has been allocated to the packet as it was being reassembled is deallocated. Deallocation of the reassembly context at step 422 frees the context for use in reassembling a subsequently received packet. Reassembling the packets prior to routing to the destination(s) allows packets to be reassembled and transmitted in the egress portion of the switch using a reduced set of reassembly contexts than would be needed if no such routing within the egress portion of the switch occurred.

It should be understood that the implementation of variations and modifications of the invention in its various aspects should be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A method for controlling reassembly and transmission of a packet in a communication switch, comprising:
   receiving a first cell of a packet corresponding to a selected source of a plurality of sources;
   allocating a reassembly context to the selected source;
   storing the first cell in a buffer;
   updating the reassembly context to reflect storage of the first cell in the buffer;
   receiving subsequent cells of the packet;
   storing each of the subsequent cells in the buffer;
   updating the reassembly context as each subsequent cell is stored in the buffer; and
   when a subsequent cell of the packet is determined to be an end of message cell indicating the end of the packet:
      completing reassembly of the packet in the buffer to produce a reassembled packet;
      queuing the reassembled packet for transmission to a destination of a plurality destinations; and
      deallocating the reassembly context.

2. The method of claim 1, wherein the reassembly context includes a head pointer and a tail pointer corresponding to the packet as stored in the buffer, wherein the packet is stored as a linked list in the buffer.

3. The method of claim 2, wherein storing each of the subsequent cells in the buffer further comprises appending each of the subsequent cells to the linked list, wherein updating the reassembly context further comprises updating the tail pointer of the linked list to reflect addition of each of the subsequent cells to the linked list.

4. The method of claim 1, wherein allocating the reassembly context further comprises allocating the reassembly context from a set of reassembly contexts.

5. The method of claim 4, wherein a number of reassembly contexts in the set of reassembly contexts is fewer than a number of sources of the plurality of sources.

6. The method of claim 1, wherein queuing the reassembled packet further comprises passing at least one control cell to a traffic management device that controls transmission of packets to at least a portion of the plurality of destinations.

7. The method of claim 1, wherein queuing the reassembled packet further comprises queuing the reassembled packet for transmission to multiple destinations of the plurality of destinations.

8. The method of claim 1, wherein queuing the reassembled packet further comprises changing encapsulation of the reassembled packet.

9. An egress circuit for a communication switch, comprising:
a context table that stores a plurality of reassembly contexts;
a buffer;
a traffic management block operably coupled to the context table and the buffer, wherein the traffic management block receives indications that packets corresponding to reassembly contexts of the plurality of reassembly contexts are ready for transmission, wherein the traffic management block transmits packets ready for transmission over at least one egress connection; and
routing circuitry operably coupled to the context table, the traffic management block, and the buffer, wherein the routing circuitry is operably coupled to receive cells corresponding to a source, wherein for a first cell received for a packet from the source, the routing circuitry allocates a first reassembly context to the source and stores the first cell in the buffer and updates the first reassembly context to reflect the storage of the first cell, wherein for subsequent cells of the packet, the routing circuitry stores the subsequent cells in the buffer and updates the first reassembly context to reflect storage of the subsequent cells, wherein when a final cell for the packet is received, the routing circuitry:
stores the final cell in the buffer;
updates the first reassembly context to reflect storage of the final cell;
provides an indication to the traffic management block that the packet corresponding to the first reassembly context is ready for transmission; and
deallocates the first reassembly context.

10. The egress circuit of claim 9, wherein the egress circuit is included in a communications switch that includes a plurality of ingress circuits and a switching fabric, wherein the source is an ingress connection provided to one of the ingress circuits, wherein the routing circuitry receives cells corresponding to a plurality of ingress connections provided to at least a portion of the plurality of ingress circuits, wherein the routing circuitry allocates and deallocates reassembly contexts to packets received via the plurality of ingress connections.

11. The egress circuit of claim 10, wherein a number of reassembly contexts in the plurality of reassembly contexts is less than a number of ingress connections in the plurality of ingress connections.

12. The egress circuit of claim 10, wherein the communication switch is an asynchronous transfer mode switch.

13. The egress circuit of claim 9, wherein cells received for the packet are stored in the buffer as a linked list, and wherein the first reassembly context stores a head pointer and a tail pointer corresponding to the linked list.

14. The egress circuit of claim 9, wherein the traffic management block includes a plurality of queues, wherein the traffic management block queues packets awaiting transmission in one of the plurality of queues prior to transmission.

15. The egress circuit of claim 9, wherein the routing circuitry provides the indication to the traffic management block that the packet corresponding to the first reassembly context is ready for transmission by providing a control cell to the traffic management block.

16. The egress circuit of claim 15, wherein the routing circuitry provides multiple control cells to the traffic management block for the packet such that the traffic management block transmits the packet over multiple egress connections.

17. The egress circuit of claim 16, wherein the routing circuitry provides the traffic management block with encapsulation modification information, wherein the traffic management block modifies encapsulation of the packet prior to transmission on at least one of the multiple egress connections.

18. A packet reassembly processor, comprising:
a processing module; and
memory operably coupled to the processing module, wherein the memory stores operating instructions that, when executed by the processing module, cause the processing module to perform functions that include:
in response to receipt of a first cell of a packet corresponding to a selected source of a plurality of sources, allocating a reassembly context to the selected source;
storing the first cell in a buffer;
updating the reassembly context to reflect storage of the first cell in the buffer;
receiving subsequent cells of the packet;
storing each of the subsequent cells in the buffer;
updating the reassembly context as each subsequent cell is stored in the buffer; and
when a subsequent cell of the packet is determined to be an end of message cell indicating the end of the packet:
completing reassembly of the packet in the buffer to produce a reassembled packet;
queuing the reassembled packet for transmission to a destination of a plurality destinations; and
deallocating the reassembly context.

19. The packet reassembly processor of claim 18, wherein the reassembly context includes a head pointer and a tail pointer corresponding to the packet as stored in the buffer, wherein the packet is stored as a linked list in the buffer.

20. The packet reassembly processor of claim 19, wherein the memory includes operating instructions such that the processing module stores each of the subsequent cells in the buffer by appending each of the subsequent cells to the linked list, and wherein the instructions cause the processing module to update the reassembly context by updating the tail pointer of the linked list to reflect addition of each of the subsequent cells to the linked list.

21. The packet reassembly processor of claim 18, wherein the memory includes operating instructions such that the processing module allocates the reassembly context from a set of reassembly contexts.

22. The packet reassembly processor of claim 21, wherein a number of reassembly contexts in the set of reassembly contexts is fewer than a number of sources of the plurality of sources.

23. The packet reassembly processor of claim 21, wherein the memory includes operating instructions such that the processing module queues the reassembled packet in a manner that includes passing at least one control cell to a traffic management device that controls transmission of packets to at least a portion of the plurality of destinations.

24. The packet reassembly processor of claim 21, wherein the memory includes operating instructions such that the processing module wherein queues the reassembled packet for transmission to multiple destinations of the plurality of destinations.

25. The packet reassembly processor of claim 21, wherein the memory includes operating instructions such that when the processing module queues the reassembled packet, the processing module causes encapsulation of the reassembled packet to be changed.

26. An egress circuit for a communication switch, comprising:
routing circuitry operably coupled to receive cells corresponding to a plurality of sources, wherein for a first cell received for a packet from a particular source of the plurality of sources, the routing circuitry assigns allocates a reassembly context to the packet and outputs the cell with an indication as to the reassembly context allocated, wherein for subsequent cells received for the packet, the routing circuitry determines that the subsequent cells correspond to the packet and outputs the subsequent cells with the indication of the reassembly context, wherein for a final cell received for the packet, the routing circuitry determines that the final cell corresponds to the packet and outputs the final cell with the indication as to the reassembly context and an indication corresponding to at least one destination;
a buffer; and
a traffic management block operably coupled to the buffer and the routing circuitry, wherein the traffic management block receives cells from the routing circuitry with accompanying indications, wherein the traffic management block maintains a plurality of reassembly contexts for reassembling packets in the buffer, wherein the traffic management block stores received cells in the buffer at locations corresponding to the plurality of contexts, wherein when a final cell for a completed packet is received, the traffic management block queues the completed packet for transmission over the at least one egress connection included with the final cell for the completed packet as received from the routing circuitry, wherein the traffic management block.

27. The egress circuit of claim 26, wherein the routing circuitry performs cyclical redundancy check verification for packets received, wherein when cyclical redundancy check verification indicates that an at least partially received packet has been corrupted, the routing circuitry may cause the at least partially received packet to be purged.

28. The egress circuit of claim 26, wherein the routing circuitry deallocates reassembly contexts corresponding to packets when final cells for the packets are received.

* * * * *